(12) United States Patent
Zhang et al.

(10) Patent No.: US 9,979,706 B2
(45) Date of Patent: May 22, 2018

(54) DATA ENCRYPTION AND DECRYPTION METHOD AND ENCRYPTION AND DECRYPTION DEVICE

(71) Applicant: Guangdong Oppo Mobile Telecommunications Corp., Ltd., Dongguan (CN)

(72) Inventors: Haiping Zhang, Dongguan (CN); Yibao Zhou, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days. days.

(21) Appl. No.: 15/805,398

(22) Filed: Nov. 7, 2017

(65) Prior Publication Data

US 2018/0069839 A1 Mar. 8, 2018

Related U.S. Application Data

(63) Continuation of application No. 15/542,426, filed as application No. PCT/CN2016/091601 on Jul. 25, 2016.

(30) Foreign Application Priority Data

Oct. 28, 2015 (CN) .......................... 2015 1 0719751

(51) Int. Cl.
*H04L 9/26* (2006.01)
*H04L 29/06* (2006.01)
*H04L 9/08* (2006.01)
*H04L 9/16* (2006.01)
*H04L 9/32* (2006.01)

(52) U.S. Cl.
CPC ........ *H04L 63/0428* (2013.01); *H04L 9/0894* (2013.01); *H04L 9/16* (2013.01); *H04L 9/3231* (2013.01)

(58) Field of Classification Search
CPC .................................................... H04L 63/0428
USPC ............................................................ 726/27
See application file for complete search history.

(56) References Cited

U.S. PATENT DOCUMENTS

| | | | |
|---|---|---|---|
| 2008/0244734 A1* | 10/2008 | Okaue | G06F 21/32 726/19 |
| 2009/0240950 A1 | 9/2009 | Suzuki et al. | |
| 2013/0174282 A1 | 7/2013 | Cui et al. | |
| 2014/0101444 A1 | 4/2014 | Lee et al. | |
| 2015/0009010 A1* | 1/2015 | Biemer | G06F 21/32 340/5.83 |

FOREIGN PATENT DOCUMENTS

| | | |
|---|---|---|
| CN | 1494252 A | 5/2004 |
| CN | 101512959 A | 8/2009 |
| CN | 101895877 A | 11/2010 |

(Continued)

*Primary Examiner* — Longbit Chai
(74) *Attorney, Agent, or Firm* — JMB Davis Ben-David

(57) ABSTRACT

An encryption method for data includes acquiring data to be encrypted and user information set relevant to the encryption, sending a key acquisition instruction to a terminal corresponding to the user information, receiving a key returned from the terminal corresponding to the user information, encrypting the data to be encrypted by using the key, and transmitting encrypted data to the terminal corresponding to the user information.

8 Claims, 8 Drawing Sheets

(56) References Cited

FOREIGN PATENT DOCUMENTS

| | | |
|---|---|---|
| CN | 103188219 A | 7/2013 |
| CN | 104091106 A | 10/2014 |
| CN | 104507080 A | 4/2015 |
| CN | 104573513 A | 4/2015 |
| CN | 104992100 A | 10/2015 |
| CN | 105262756 A | 1/2016 |
| WO | 2013009280 A2 | 1/2013 |

\* cited by examiner

DATA ENCRYPTION AND DECRYPTION METHOD AND ENCRYPTION AND DECRYPTION DEVICE

CROSS REFERENCE TO RELATED APPLICATION

This is a continuation of co-pending U.S. patent application Ser. No. 15/542,426, filed on Jul. 9, 2017, which is the national stage of International Patent Application No. PCT/CN2016/091601, filed on Jul. 25, 2016, which claims priority to Chinese Patent Application No. 201510719751.3, filed on Oct. 28, 2015. The entire disclosures of the above applications are incorporated herein by reference.

BACKGROUND

1. Field of the Disclosure

The present disclosure relates to an encryption and decryption technology, more particularly, to a method of encrypting and decrypting data and an encryption and decryption device.

2. Description of the Related Art

With the development of society, the Internet and the mobile Internet have already become an inseparable part of human life. As the Internet brings a variety of conveniences and rapidity, the leakage of user's personal information has become the focus of attention. In the related art, instant chat software or instant communication tools do not encrypt the file contents themselves when the files are transferred. That is, any other person is able to normally open and view the files to obtain their contents as long as the files are accessed. In this manner, the security is very poor. If confidential documents need to be transferred through real-time chat software, or if computers are hacked, then valuable personal information or confidential documents are likely to leak.

Therefore, a relatively severe security problem exists in the related art when private documents are used in the Internet by the user thereof.

Accordingly, there is a need to provide a new technical scheme to resolve the above technical problems.

SUMMARY

An objective of the present disclosure is to provide a method of encrypting and decrypting data and an encryption and decryption device to resolve the relatively severe security problem in the related art when private documents are used in the Internet by the user thereof.

In order to resolve the above technical problems, the technical scheme provided by the present disclosure is introduced.

In one aspect, an encryption method for data is provided. The encryption method for data includes the following blocks.

Data to be encrypted and the user information set relevant to the encryption are acquired.

A key acquisition instruction is sent to a terminal corresponding to the user information based on the user information set relevant to the encryption.

A key returned from the terminal corresponding to the user information is received.

The data is encrypted by using the key.

Encrypted data is transmitted to the terminal corresponding to the user information.

In another aspect, a decryption method for data is provided. The decryption method for data includes the following blocks.

Encrypted data and user information set relevant to the encryption are acquired.

A decryption key for the encrypted data is acquired based on the relevant user information.

The encrypted data is decrypted by using the decryption key.

The data is opened if decryption is successful.

In still another aspect, an encryption device for data is provided. The encryption device includes an acquisition module, an instruction sending module, a key receiving module, an encryption module and a transmission module.

The acquisition module is configured to acquire data to be encrypted and user information set relevant to the encryption.

The instruction sending module is configured to send a key acquisition instruction to a terminal corresponding to the user information based on the user information set relevant to the encryption.

The key receiving module is configured to receive a key returned from the terminal corresponding to the user information.

The encryption module is configured to encrypt the data to be encrypted by using the key.

The transmission module is configured to transmit encrypted data to the terminal corresponding to the user information.

In yet another aspect, a decryption device for data is provided. The decryption device for data includes an acquisition module, a decryption acquiring module, a decryption acquiring module, a decryption module and an opening module.

The acquisition module is configured to acquire encrypted data and set relevant user information.

The decryption acquiring module is configured to acquire a decryption key for the encrypted data based on the relevant user information.

The decryption module is configured to decrypt the encrypted data by using the decryption key.

The opening module is configured to open the data if decryption is successful.

The present disclosure further provides a mobile terminal including the above encryption device for data.

The present disclosure further provides a mobile terminal including the above decryption device for data.

As compared with the related art, the method of encrypting and decrypting data and the encryption and decryption device according to the present disclosure acquire the encryption key from the relevant user, encrypt the data through the encryption key, and send the encrypted data to the another terminal. The another terminal acquires the decryption key corresponding to the relevant user and decrypts the encrypted data through the decryption key, and only when the decryption is successful can the data be opened. The present disclosure can ensure the security of files transmitted over a network, which is convenient and fast and significantly improves the user experience.

DESCRIPTION OF THE EMBODIMENTS

Please refer to the drawings, in which the same components are represented by the same component symbols. The principle of the present disclosure is illustrated by an application in a suitable computing environment. The following description is based on the illustrated specific embodiment of the present disclosure, which should not be construed as limiting other specific embodiments not discussed in detail herein.

While the principle of the present disclosure is being described in the foregoing context, it is not meant to be limiting as those of skill in the art will appreciate that the various steps and operations described hereinafter may also be implemented in hardware. The principle of the present disclosure is performed by using many other general-purpose or specific-purpose operations, communications environments, or configurations.

The method of encrypting and decrypting data and the encryption and decryption device according to the present disclosure are mainly applied to terminal equipment, such as a cell phone, a portable computer, a personal digital assistant (PDA), etc.

A detailed description is provided in the following.

Embodiment I

Figure 1:
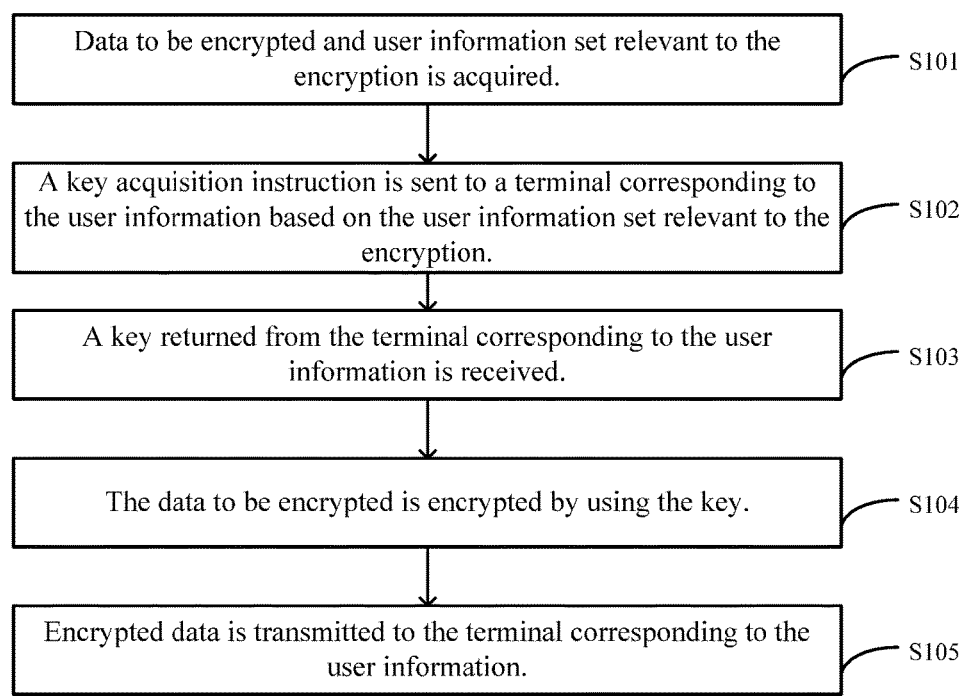
FIG. 1 illustrates a schematic flowchart for implementing an encryption method for data according to a first embodiment of the present disclosure.

A description is provided with reference to FIG. 1. FIG. 1 illustrates an encryption method for data according to an embodiment of the present disclosure.

The encryption method for data is applied to terminal equipment. In greater detail, the encryption method can begin at block S101.

At block S101, data to be encrypted and user information set relevant to the encryption are acquired.

According to the present embodiment, acquiring the user information set relevant to the encryption may include but is not limited to the following: acquiring user information of an another terminal that is set.

At block S102, a key acquisition instruction is sent to a terminal corresponding to the user information based on the user information set relevant to the encryption.

According to the present embodiment, the key acquisition instruction is sent to the another terminal based on acquired user information of the another terminal.

At block S103, a key returned from the terminal corresponding to the user information is received.

According to the present embodiment, the another terminal acquires eyeball information of a user at its end to serve as the key. The another terminal returns the acquired eyeball information to a terminal at a sender's end to serve as the key for encrypting the data to be encrypted.

According to the present embodiment, after the block that the key acquisition instruction is sent to the terminal corresponding to the user information, the method further includes the following blocks.

It is determined whether the key returned from the terminal corresponding to the user information is received within a predetermined time period.

A data transmission operation is rejected if it is determined that the key returned from the terminal corresponding to the user information is not received within the predetermined time period.

Block S104 is executed if it is determined that the key returned from the terminal corresponding to the user information is received within the predetermined time period.

At block S104, the data to be encrypted is encrypted by using the key.

According to the present embodiment, the data to be encrypted is encrypted by using the eyeball information acquired by the another terminal.

At block S105, encrypted data is transmitted to the terminal corresponding to the user information.

As can be seen from the above, the present embodiment obtains the encryption key through the relevant user, encrypts the data through the key, and sends the encrypted data to the another terminal. The present disclosure can ensure the security of files transmitted over a network, which is convenient and fast and significantly improves the user experience.

Embodiment II

Figure 2:
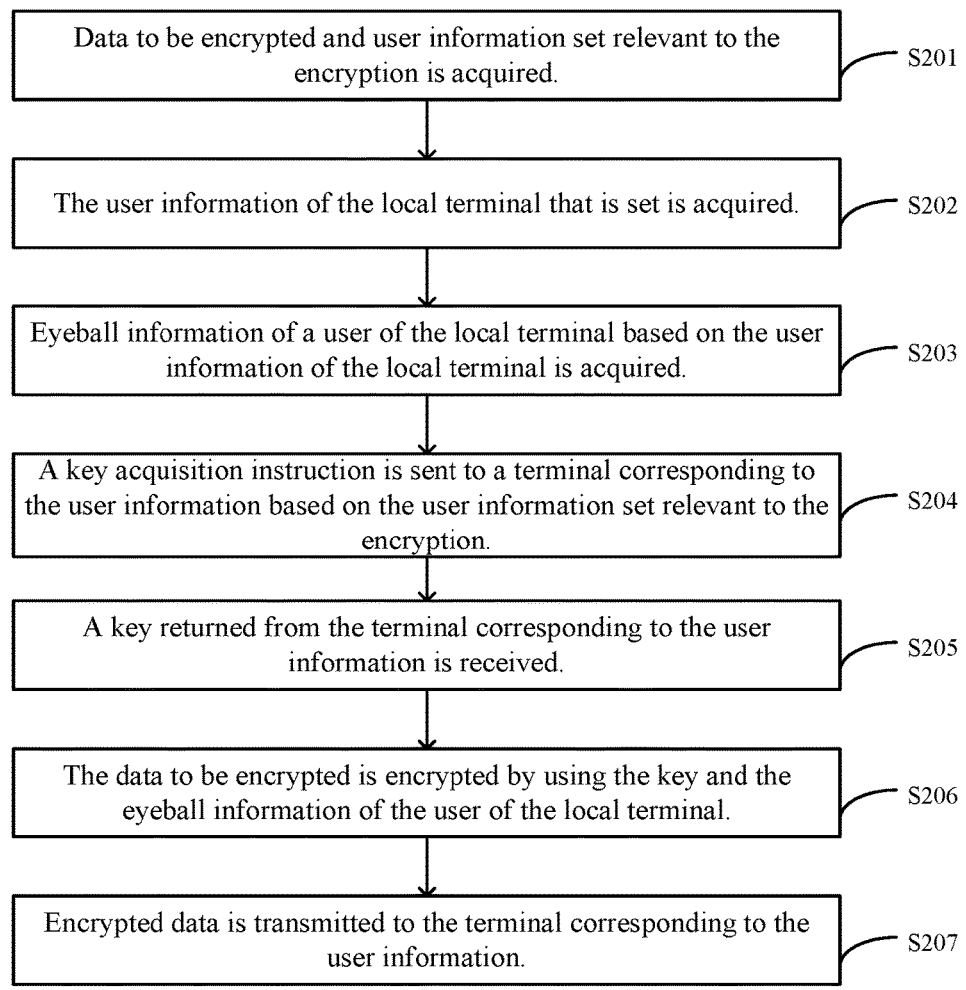
FIG. 2 illustrates a schematic flowchart for implementing an encryption method for data according to a second embodiment of the present disclosure.

A description is provided with reference to FIG. 2. FIG. 2 illustrates an encryption method for data according to another embodiment of the present disclosure.

The encryption method for data is applied to terminal equipment. In greater detail, the encryption method can begin at block S201.

At block S201, data to be encrypted and user information set relevant to the encryption are acquired.

According to the present embodiment, acquiring the user information set relevant to the encryption may include but is not limited to the following: acquiring user information of a local terminal and user information of another terminal.

At block S202, the user information of the local terminal that is set is acquired.

At block S203, eyeball information of a user of the local terminal is acquired based on the user information of the local terminal.

In greater detail, according to the present embodiment, block S203 includes the following blocks.

An eyeball acquisition module of the local terminal turns on based on the user information of the local terminal. The eyeball information of the user of the local terminal is acquired through the eyeball acquisition module.

At block S204, a key acquisition instruction is sent to a terminal corresponding to the user information based on the user information set relevant to the encryption.

According to the present embodiment, the key acquisition instruction is sent to the another terminal based on the acquired user information of the another terminal.

At block S205, a key returned from the terminal corresponding to the user information is received.

According to the present embodiment, the another terminal acquires eyeball information of a user at its end to serve as the key. The another terminal returns the acquired eyeball information to a terminal at a sender's end to serve as the key for encrypting the data to be encrypted.

At block S206, the data to be encrypted is encrypted by using the key and the eyeball information of the user of the local terminal.

According to the present embodiment, the data is encrypted by using the eyeball information of the user of the local terminal and the eyeball information of the user of the another terminal in combination.

At block S207, encrypted data is transmitted to the terminal corresponding to the user information.

However, block S204 and block S205 may be executed after block 201 is executed. Then, block S202 and block S203 are executed.

In at least one embodiment, after the block that the key acquisition instruction is sent to the terminal corresponding to the user information, the method further includes the following blocks.

It is determined whether the key returned from the terminal corresponding to the user information is received within a predetermined time period.

A data transmission operation is rejected if it is determined that the key returned from the terminal corresponding to the user information is not received within the predetermined time period.

Block S206 is executed if it is determined that the key returned from the terminal corresponding to the user information is received within the predetermined time period.

As can be seen from the above, the present embodiment obtains the encryption key through acquiring the eyeball information of the local terminal and the another terminal, combines the eyeball information of the local terminal and the another terminal to encrypt data, and transmits the encrypted data to the another terminal. The present disclosure can ensure the security of files transmitted over a network, which is convenient and fast and significantly improves the user experience.

Embodiment III

Figure 3:
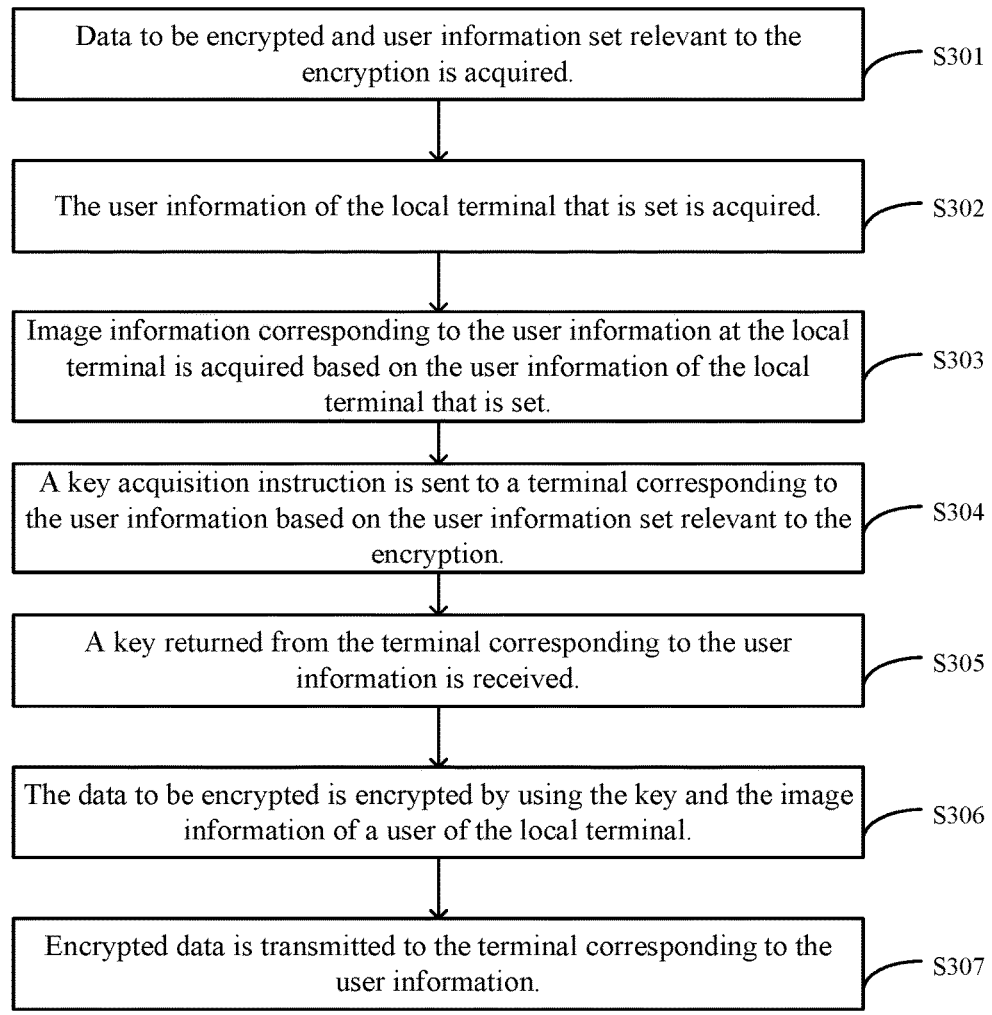
FIG. 3 illustrates a schematic flowchart for implementing an encryption method for data according to a third embodiment of the present disclosure.

A description is provided with reference to FIG. 3. FIG. 3 illustrates an encryption method for data according to still another embodiment of the present disclosure.

The encryption method for data is applied to terminal equipment. In greater detail, the encryption method can be begin at block S301.

At block S301, data to be encrypted and user information set relevant to the encryption are acquired.

According to the present embodiment, acquiring the user information set relevant to the encryption may include but is not limited to the following: acquiring user information of a local terminal and user information of another terminal.

At block S302, the user information of the local terminal that is set is acquired.

At block S303, image information corresponding to the user information at the local terminal is acquired based on the user information of the local terminal that is set.

At block S304, a key acquisition instruction is sent to a terminal corresponding to the user information based on the user information set relevant to the encryption.

According to the present embodiment, the key acquisition instruction is sent to the another terminal based on the acquired user information of the another terminal.

At block S305, a key returned from the terminal corresponding to the user information is received.

According to the present embodiment, the another terminal acquires eyeball information of a user at its end to serve as the key. The another terminal returns the acquired eyeball information to a terminal at a sender's end to serve as the key for encrypting the data to be encrypted.

At block S306, the data to be encrypted is encrypted by using the key and the image information of a user of the local terminal.

According to the present embodiment, the data to be encrypted is encrypted by using the eyeball information of the user of the another terminal and the image information of the user of the local terminal in combination.

At block S307, encrypted data is transmitted to the terminal corresponding to the user information.

However, block S304 and block S305 may be executed after block 301 is executed. Then, block S302 and block S303 are executed.

In at least one embodiment, after the block that the key acquisition instruction is sent to the terminal corresponding to the user information, the method further includes the following blocks.

It is determined whether the key returned from the terminal corresponding to the user information is received within a predetermined time period.

A data transmission operation is rejected if it is determined that the key returned from the terminal corresponding to the user information is not received within the predetermined time period.

Block S306 is executed if it is determined that the key returned from the terminal corresponding to the user information is received within the predetermined time period.

As can be seen from the above, the present embodiment obtains the encryption key through acquiring the image information of user of the local terminal and the eyeball information of the another terminal, combines the image information of the user of the local terminal and the eyeball information of the another terminal to encrypt data, and transmits the encrypted data to the another terminal. The present disclosure can ensure the security of files transmitted over a network, which is convenient and fast and significantly improves the user experience.

Embodiment IV

Figure 4:
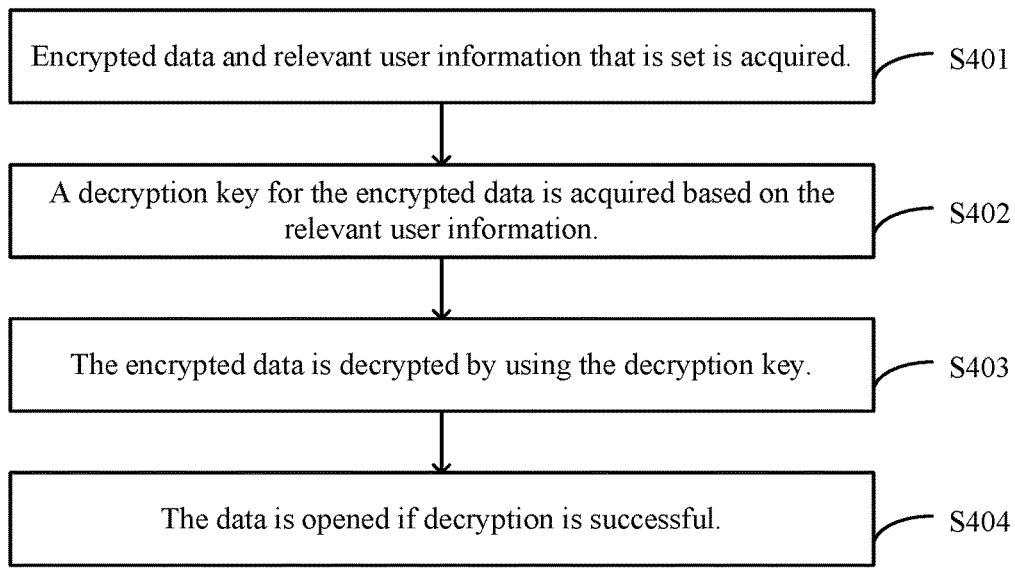
FIG. 4 illustrates a schematic flowchart for implementing a decryption method for data according to a fourth embodiment of the present disclosure.

A description is provided with reference to FIG. 4. FIG. 4 illustrates a decryption method for data according to an embodiment of the present disclosure.

The decryption method for data is applied to terminal equipment. In greater detail, the decryption method can be begin at block S401.

At block S401, encrypted data and relevant user information that is set are acquired.

According to the present embodiment, acquiring the relevant user information that is set may include but is not limited to the following: acquiring user information of a local terminal.

At block S402, a decryption key for the encrypted data is acquired based on the relevant user information.

In greater detail, according to the present embodiment, block S402 includes the following blocks.

An eyeball acquisition module of the local terminal turns on based on the user information of the local terminal, acquiring the eyeball information of a user of the local terminal through the eyeball acquisition module to serve as the decryption key.

At block S403, the encrypted data decrypted by using the decryption key.

According to the present embodiment, the encrypted data is decrypted by using the acquired eyeball information of the user of the local terminal.

In at least one embodiment, after block S403 the method further includes the following blocks.

It is determined whether a number of times that decryption fails exceeds a preset threshold value within a predetermined time period.

The encrypted data is deleted if the number of times that decryption fails exceeds the preset threshold value.

At block S404, the data is opened if decryption is successful.

As can be seen from the above, in the present embodiment an another terminal obtains the decryption key corresponding to a relevant user, decrypts the encrypted data through the decryption key, and the data is opened if the decryption is successful and the data is deleted if the decryption fails. The present disclosure can ensure the security of files transmitted over a network, which is convenient and fast and significantly improves the user experience.

Embodiment V

Figure 5:
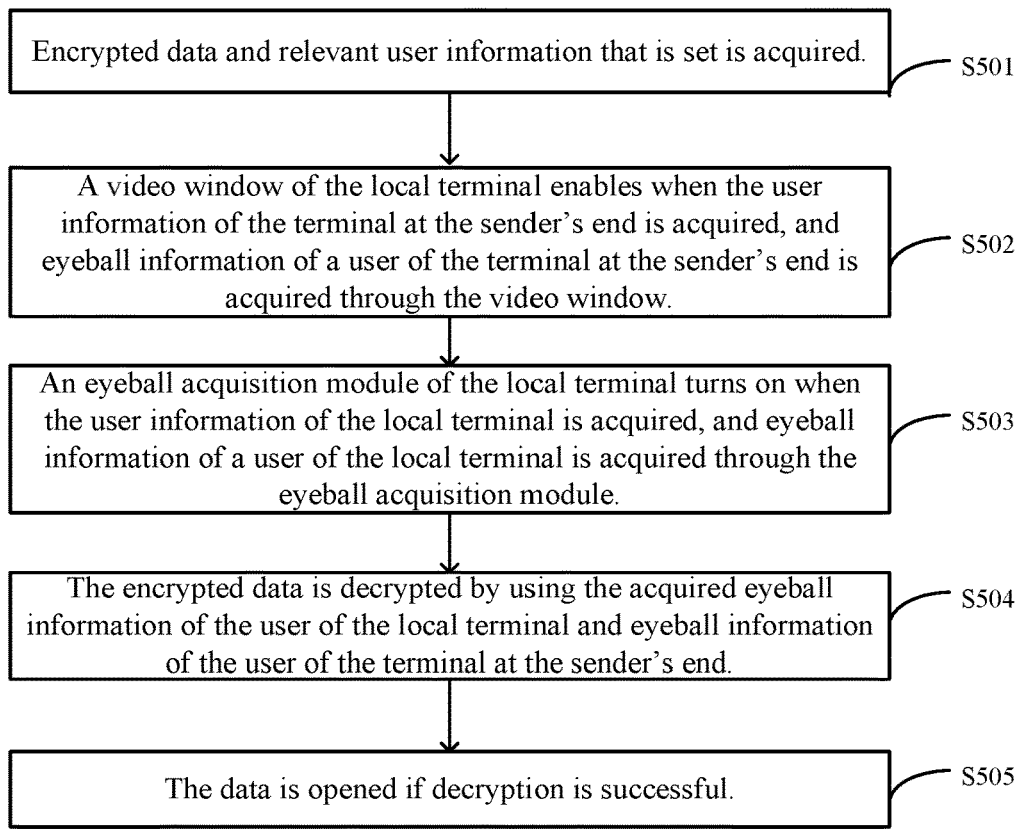
FIG. 5 illustrates a schematic flowchart for implementing a decryption method for data according to a fifth embodiment of the present disclosure.

A description is provided with reference to FIG. 5. FIG. 5 illustrates a decryption method for data according to another embodiment of the present disclosure.

The decryption method for data is applied to terminal equipment. In greater detail, the decryption method includes the following blocks.

At block S501, encrypted data and relevant user information that is set are acquired.

According to the present embodiment, acquiring the relevant user information that is set may include but is not limited to the following: acquiring user information of a local terminal and user information of a terminal at a sender's terminal.

At block S502, a video window of the local terminal enables when the user information of the terminal at the sender's end is acquired. Eyeball information of a user of the terminal at the sender's end is collected through the video window.

At block S503, an eyeball acquisition module of the local terminal turns on when the user information of the local terminal is acquired. Eyeball information of a user of the local terminal is collected through the eyeball acquisition module.

At block S504, the encrypted data is decrypted by using the acquired eyeball information of the user of the local terminal and eyeball information of the user of the terminal at the sender's end.

In at least one embodiment, after block S504 the method further includes the following blocks.

It is determined whether a number of times that decryption fails exceeds a preset threshold value within a predetermined time period.

The encrypted data is deleted if the number of times that decryption fails exceeds the preset threshold value.

At block S505, the data is opened if decryption is successful.

However, block S502 may be executed after block S503 is executed.

As can be seen from the above, in the present embodiment an another terminal obtains the decryption key through acquiring the eyeball information of the user of the local terminal and the eyeball information of the user of another terminal, decrypts the encrypted data through the decryption key, and the data is opened if the decryption is successful and the data is deleted if the decryption fails. The present disclosure can ensure the security of files transmitted over a network, which is convenient and fast and significantly improves the user experience.

Embodiment VI

Figure 6:
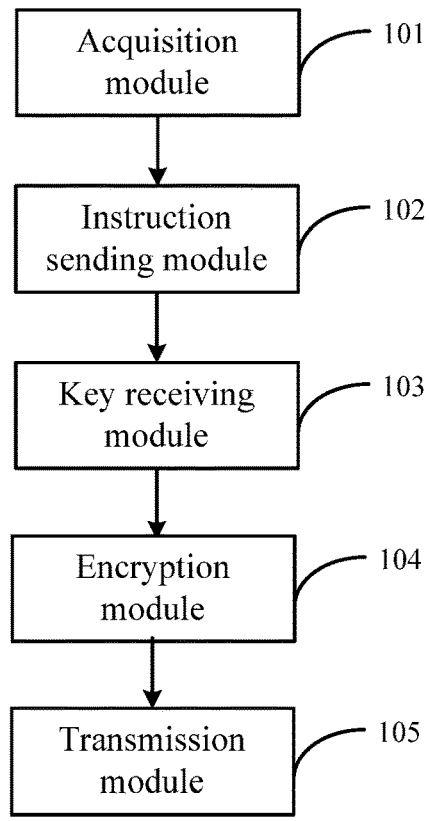
FIG. 6 illustrates a schematic diagram of a structure of an encryption device for data according to a sixth embodiment of the present disclosure.

A description is provided with reference to FIG. 6. FIG. 6 illustrates a schematic diagram of a structure of an encryption device for data according to a sixth embodiment of the present disclosure. In order to facilitate illustration, only portions relevant to the present embodiment are shown. The encryption device includes an acquisition module 101, an instruction sending module 102, a key receiving module 103, an encryption module 104, and a transmission module 105. The encryption device may be incorporated in a software unit, a hardware unit, or a unit in which software and hardware are combined in a terminal.

The acquisition module 101 is configured to acquire data to be encrypted and user information set relevant to the encryption.

The instruction sending module 102 is configured to send a key acquisition instruction to a terminal corresponding to the user information based on the user information set relevant to the encryption.

The key receiving module 103 is configured to receive a key returned from the terminal corresponding to the user information.

The encryption module 104 is configured to encrypt the data to be encrypted by using the key.

The transmission module 105 is configured to transmit encrypted data to the terminal corresponding to the user information.

In at least one embodiment, the encryption device further includes a judge module and a rejection module.

The judge module is configured to determine whether the key returned from the terminal corresponding to the user information is received within a predetermined time period.

The rejection module is configure to reject a data transmission operation if the judge module determines that the key returned from the terminal corresponding to the user information is not received within the predetermined time period.

In greater detail, the encryption module 104 is configured to encrypt the data to be encrypted by using the key if the judge module determines that the key returned from the terminal corresponding to the user information is received within the predetermined time period.

Embodiment VII

Figure 7:
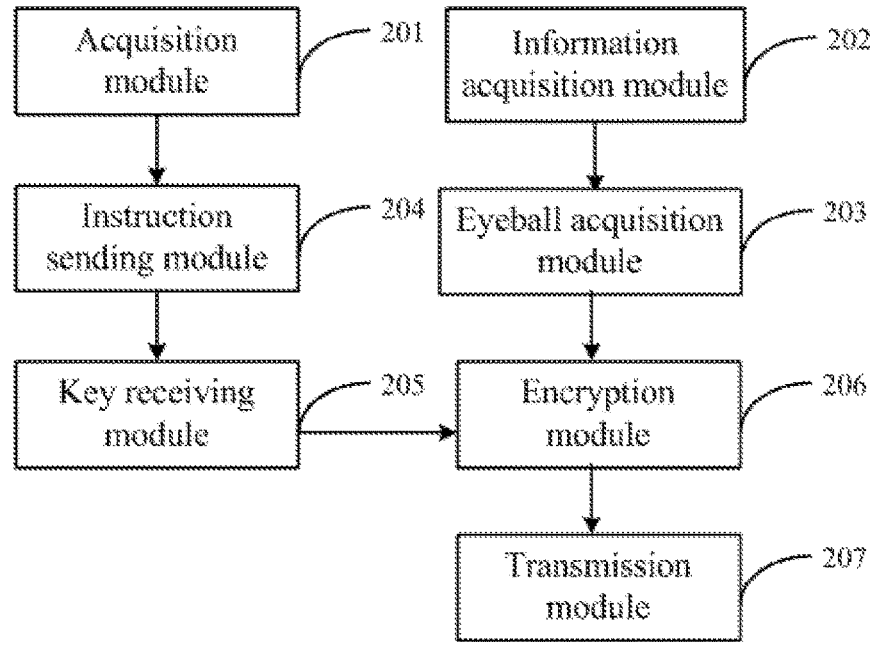
FIG. 7 illustrates a schematic diagram of a structure of an encryption device for data according to a seventh embodiment of the present disclosure.

A description is provided with reference to FIG. 7. FIG. 7 illustrates a schematic diagram of a structure of an encryption device for data according to a seventh embodiment of the present disclosure. In order to facilitate illustration, only portions relevant to the present embodiment are shown. The encryption device includes: an acquisition module 201, an information acquisition module 202, an eyeball acquisition module 203, an instruction sending module 204, a key receiving module 205, an encryption module 206, and a transmission module 207. The encryption device may be incorporated in a software unit, a hardware unit, or a unit in which software and hardware are combined in a terminal.

The acquisition module 201 is configured to acquire data to be encrypted and user information set relevant to the encryption.

The information acquisition module 202 is configured to acquire user information of a local terminal that is set.

The eyeball acquisition module 203 is configured acquire eyeball information of a user of the local terminal based on the user information of the local terminal.

The instruction sending module 204 is configured to send a key acquisition instruction to a terminal corresponding to the user information based on the user information set relevant to the encryption.

The key receiving module 205 is configured to receive a key returned from the terminal corresponding to the user information.

In greater detail, the encryption module 206 is configured to encrypt the data to be encrypted by using the key and the eyeball information of the user of the local terminal.

The transmission module 207 is configured to transmit encrypted data to the terminal corresponding to the user information.

According to the present embodiment, in greater detail, the eyeball acquisition module 203 includes: a turning-on module and an eyeball collection module.

The turning-on module is configured to turn on the eyeball collection module of the local terminal based on the user information of the local terminal.

The eyeball collection module is configured to collect the eyeball information of the user of the local terminal In at least one embodiment, the encryption device further includes a judge module and a rejection module.

The judge module is configured to determine whether the key returned from the terminal corresponding to the user information is received within a predetermined time period.

The rejection module is configure to reject a data transmission operation if the judge module determines that the key returned from the terminal corresponding to the user information is not received within the predetermined time period.

In greater detail, the encryption module 206 is configured to encrypt the data to be encrypted by using the key and the eyeball information of the user of the local terminal if the judge module determines that the key returned from the terminal corresponding to the user information is received within the predetermined time period.

Embodiment VIII

Figure 8:
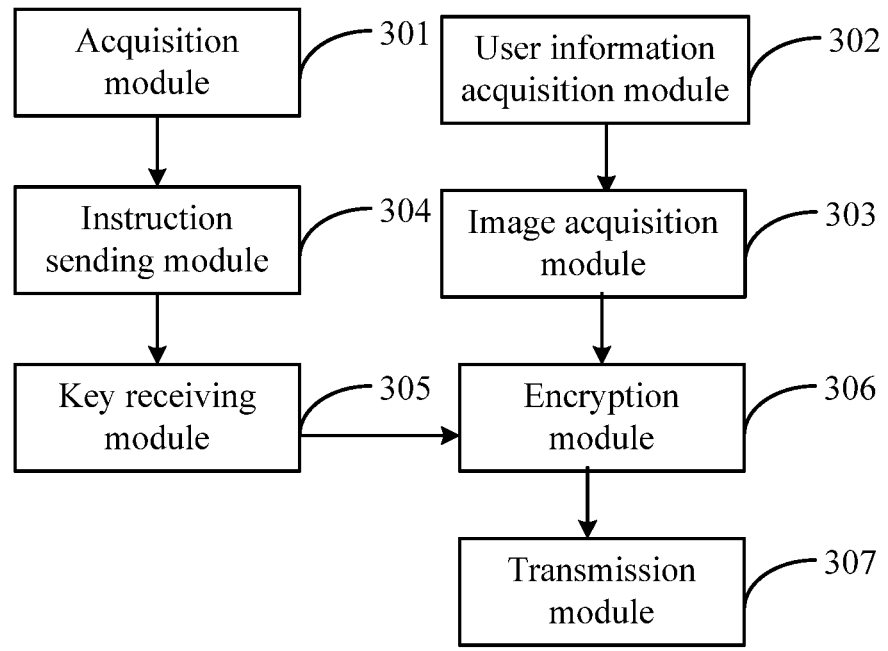
FIG. 8 illustrates a schematic diagram of a structure of an encryption device for data according to an eighth embodiment of the present disclosure.

A description is provided with reference to FIG. 8. FIG. 8 illustrates a schematic diagram of a structure of an encryption device for data according to an embodiment of the present disclosure. In order to facilitate illustration, only portions relevant to the present embodiment are shown. The encryption device includes: an acquisition module 301, a user information acquisition module 302, an image acquisition module 303, an instruction sending module 304, a key receiving module 305, an encryption module 306, and a transmission module 307. The encryption device may be incorporated in a software unit, a hardware unit, or a unit in which software and hardware are combined in a terminal.

The acquisition module 301 is configured to acquire data to be encrypted and user information set relevant to the encryption t.

The user information acquisition module 302 is configured to acquire user information of a local terminal that is set.

The image acquisition module 303 is configured to acquire image information corresponding to the user information at the local terminal based on the user information of the local terminal that is set.

The instruction sending module 304 is configured to send a key acquisition instruction to a terminal corresponding to the user information based on the user information set relevant to the encryption.

The key receiving module 305 is configured to receive a key returned from the terminal corresponding to the user information.

In greater detail, the encryption module 306 is configured to encrypt the data to be encrypted by using the key and the image information of the user of the local terminal.

The transmission module 307 is configured to transmit encrypted data to the terminal corresponding to the user information.

In at least one embodiment, the encryption device further includes: a judge module and a rejection module.

The judge module is configured to determine whether the key returned from the terminal corresponding to the user information is received within a predetermined time period.

The rejection module is configure to reject a data transmission operation if the judge module determines that the key returned from the terminal corresponding to the user information is not received within the predetermined time period.

In greater detail, the encryption module 306 is configured to encrypt the data to be encrypted by using the key and the image information of the user of the local terminal if the judge module determines that the key returned from the terminal corresponding to the user information is received within the predetermined time period.

Embodiment IX

Figure 9:
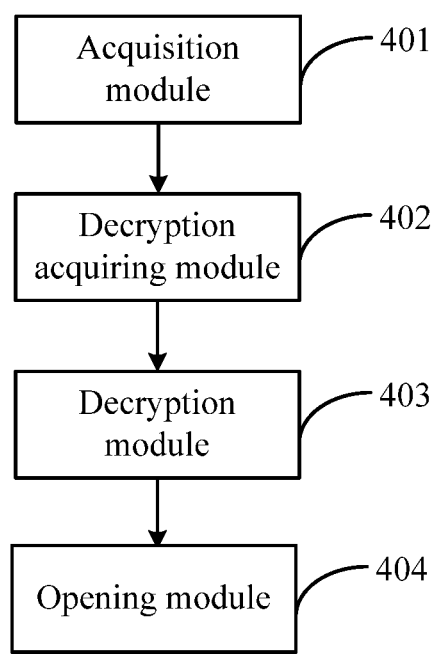
FIG. 9 illustrates a schematic diagram of a structure of a decryption device for data according to a ninth embodiment of the present disclosure.

A description is provided with reference to FIG. 9. FIG. 9 illustrates a schematic diagram of a structure of a decryption device for data according to a ninth embodiment of the present disclosure. In order to facilitate illustration, only portions relevant to the present embodiment are shown. The decryption device includes: an acquisition module 401, a decryption acquiring module 402, a decryption module 403, and an opening module 404. The decryption device may be incorporated in a software unit, a hardware unit, or a unit in which software and hardware are combined in a terminal.

The acquisition module 401 is configured to acquire encrypted data and relevant user information that is set.

The decryption acquiring module 402 is configured to acquire a decryption key for the encrypted data based on the relevant user information.

The decryption module 403 is configured to decrypt the encrypted data by using the decryption key.

The opening module 404 is configured to open the data if decryption is successful.

According to the present embodiment, when the relevant user information is user information of a local terminal, the decryption acquiring module 402 specifically includes: a turning-on module and an eyeball acquisition module.

The turning-on module is configured to turn on the eyeball acquisition module of the local terminal based on the user information of the local terminal.

The eyeball acquisition module is configured to acquire eyeball information of a user of the local terminal.

In greater detail, the decryption module 403 is configured to decrypt the encrypted data by using the acquired eyeball information of the user of the local terminal.

In at least one embodiment, the decryption device further includes a time judge module and a data deletion module.

The time judge module is configured to determine whether a number of times that decryption fails exceeds a preset threshold value within a predetermined time period.

The data deletion module is configured to delete the encrypted data if the time judge module determines that the number of times that decryption fails exceeds the preset threshold value.

Embodiment X

Figure 10:
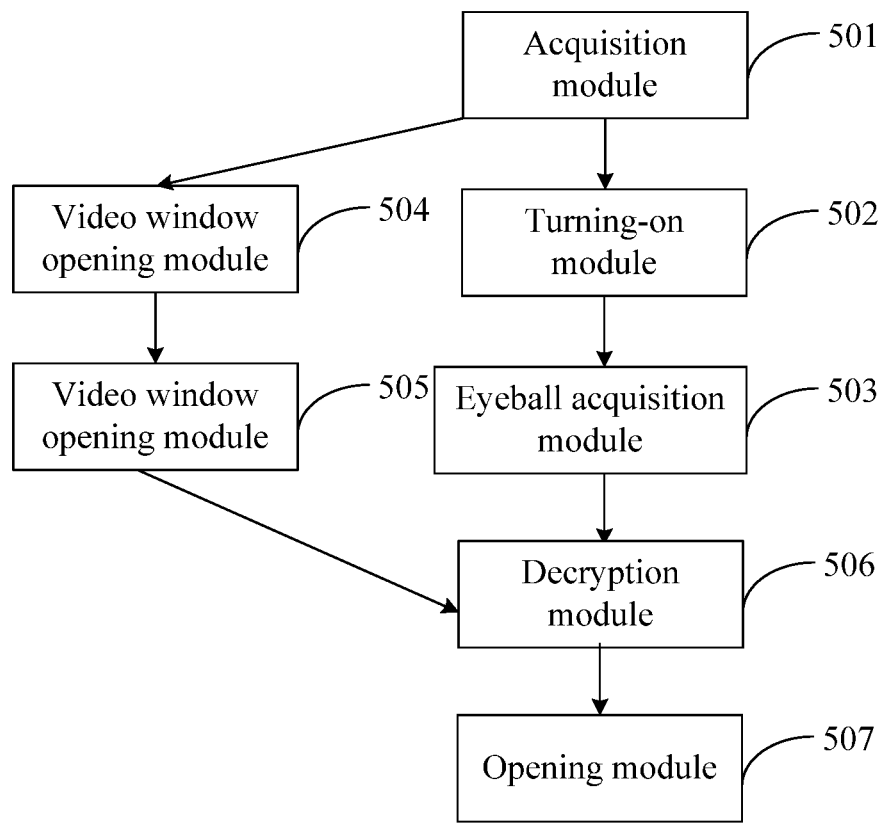
FIG. 10 illustrates a schematic diagram of a structure of a decryption device for data according to a tenth embodiment of the present disclosure.

A description is provided with reference to FIG. 10. FIG. 10 illustrates a schematic diagram of a structure of a decryption device according to an embodiment of the present disclosure. In order to facilitate illustration, only portions relevant to the present embodiment are shown. The decryption device includes: an acquisition module 501, a turning-on module 502, an eyeball acquisition module 503, a video window opening module 504, a video window acquisition module 505, a decryption module 506, and an opening module 507. The decryption device may be incorporated in a software unit, a hardware unit, or a unit in which software and hardware are combined in a terminal.

The acquisition module 501 is configured to acquire encrypted data and relevant user information that is set.

The turning-on module 502 is configured to turn on the eyeball acquisition module 503 of a local terminal when the relevant user information is user information of the local terminal.

The eyeball acquisition module 503 is configured to acquire eyeball information of a user of the local terminal.

The video window opening module 504 is configured to open a video window of the local terminal when the relevant user information is user information of a terminal at a sender's end.

The video window acquisition module 505 is configured to acquire eyeball information of a user of the terminal at the sender's end through the video window.

In greater detail, the decryption module 506 is configured to decrypt the encrypted data by using the acquired eyeball information of the user of the local terminal and eyeball information of the user of the terminal at the sender's end.

The opening module 507 is configured to open the data if decryption is successful.

In at least one embodiment, the decryption device further includes a time judge module and a data deletion module.

The time judge module is configured to determine whether a number of times that decryption fails exceeds a preset threshold value within a predetermined time period.

The data deletion module is configured to delete the encrypted data if the time judge module determines that the number of times that decryption fails exceeds the preset threshold value.

In summary, the method of encrypting and decrypting data and the encryption and decryption device according to the present disclosure acquire the encryption key from the relevant user, encrypt the data through the encryption key, and send the encrypted data to the another terminal. The another terminal acquires the decryption key corresponding to the relevant user and decrypts the encrypted data through the decryption key, and only when the decryption is successful can the data be opened. The present disclosure can ensure the security of files transmitted over a network, which is convenient and fast and significantly improves the user experience.

The method of encrypting and decrypting data and the encryption and decryption device according to the present embodiments belong to the same concept. The detailed implementation processes are described in detail in the specification, and a description in this regard is not provided.

Embodiment XI

Figure 11:
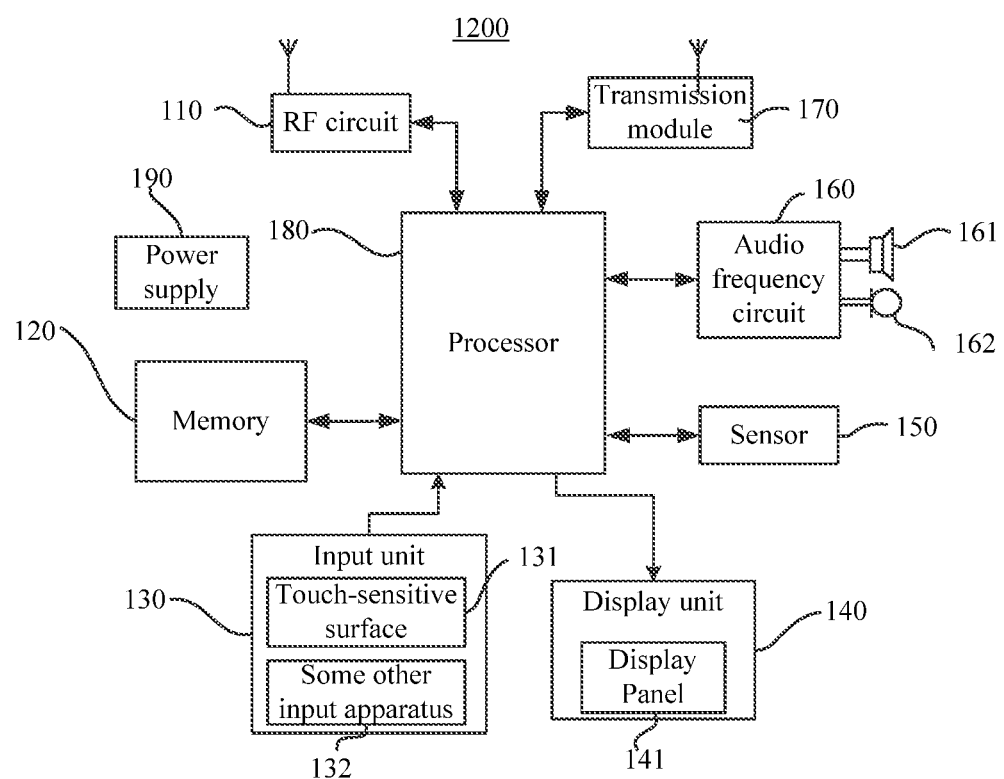
FIG. 11 illustrates a schematic diagram of a structure of a mobile terminal according to an eleventh embodiment of the present disclosure.

FIG. 11 illustrates a block diagram of a structure of a mobile terminal according to an eleventh embodiment of the present disclosure. The mobile terminal may be configured to implement the method of encrypting and decrypting data and the encryption and decryption device according to the previous embodiments. A mobile terminal 1200 may be a smartphone or a tablet computer.

As shown in FIG. 11, the mobile terminal 1200 may include components, such as a radio frequency (RF) circuit 110, a memory 120 including one or more than one (only one is shown in the figure) computer readable storage media, an input unit 130, a display unit 140, at least one sensor 150, an audio frequency circuit 160, a transmission module 170, a processor 180 including one or more than one (only one is shown in the figure) processing cores, and a power supply 190, etc. Those skilled in the art would understand that the mobile terminal 1200 is not limited to the structure of the mobile terminal 1200 shown in FIG. 11, which may include more or fewer components than illustrated, or combine certain components, or have different component configurations.

The RF circuit is configured to receive and send electromagnetic waves to realize conversion between electromagnetic waves and electrical signals so as to communicate with a communication network or some other devices. The RF circuit 110 may include various circuit components configured to perform these functions in the related art, such as an antenna, a radio frequency transceiver, a digital signal processor, an encryption/decryption chip, a subscriber identity module (SIM) card, a memory, and the like. The RF circuit 110 may communicate with various networks, such as the Internet, an intranet, a wireless network, or communicate with some other devices over a wireless network. The wireless network may include a cellular telephone network, a wireless local area network or a metropolitan area network. The above wireless networks may use various communication standards, protocols and technologies, which include but are not limited to Global System for Mobile Communication (GSM), Enhanced Data GSM Environment (EDGE), Wideband Code Division Multiple Access (WCDMA), Code Division Access (CDMA), Time Division Multiple Access (TDMA), Wireless Fidelity (Wi-Fi, IEEE 802.11a, IEEE 802.11b, IEEE 802.11g and IEEE 802.11n), Voice over Internet Protocol (VoIP), Worldwide Interoperability for Microwave Access (Wi-Max), other protocols used for emails, instant messaging and short messaging, and any other suitable communication protocols, even those protocols that have not yet been developed at present.

The memory 120 may be configured to store software programs and modules, such as program instructions/modules corresponding to the method of encrypting and decrypting data and the encryption and decryption device according to the previous embodiments. The processor 180 executes various functional applications and data processing, that is, implements the method of encrypting and decrypting data and the encryption and decryption functions through running the software programs and modules stored in the memory 120. The memory 120 may include a high speed random access memory, and may further include a nonvolatile memory, such as one or more magnetic storage elements, a flash memory, or some other nonvolatile solid-state memory. In some embodiments, the memory 120 may further include memories that are remotely disposed from the processor 180. These remote memories may be connected to the mobile terminal 1200 through a network. Examples of the network includes but is not limited to the Internet, an intranet, a local area network, a mobile communication network, and combinations thereof.

The input unit 130 may be configured to receive input digital information or character information, and generate a keyboard, mouse, joystick, optical or trackball signal input related to user settings and function control. In greater detail, the input unit 130 may include a touch-sensitive surface 131 and some other input apparatus 132. The touch-sensitive surface 131 is also called a touch screen or a touch pad, which can collect a touch operation by a user on or near it (for example, the user uses any suitable object or attachment, such as a finger, a stylus pen, and the like, to operate on or near the touch-sensitive surface 131), and drives a connection means correspondingly according to a predetermined program. Optionally, the touch-sensitive surface 131 may include two parts, that is, a touch detector and a touch controller. The touch detector detects a touch position of the user and detects a signal caused by the touch operation to transmit the signal to the touch controller. The touch controller receives touch information from the touch detector and converts it into touch coordinates and then sends them to the processor 180, and can receive commands from the processor 180 to execute. In addition, the touch-sensitive surface 131 may be realized by using various types of touch-sensitive surfaces, such as a resistive type, a capacitive type, an infrared type, and a surface acoustic wave type. In addition to the touch-sensitive surface 131, the input unit 130 may further include another input device 132. In greater detail, the another input device 132 may include but not limited to one or more of a physical keyboard, function keys (such as a volume control key, a switch key, etc.), a trackball, a mouse, a joystick, and the like.

The display unit 140 may be configured to display information input by the user or information provided to the user and various graphical user interfaces of the mobile terminal 1200. These graphical user interfaces may be constituted by a graph, text, an icon, video, or any combination thereof. The display unit 140 may include a display panel 141. Optionally, the display panel 141 may be configured by using a liquid crystal display (LCD), an organic light-emitting diode (OLED), etc. Furthermore, the touch-sensitive surface 131 may cover the display panel 141. After the touch-sensitive surface 131 detects the touch operation on or near it, the touch operation is sent to the processor 180 to determine the type of touch event, and then the processor 180 provides a visual output on the display panel 141 correspondingly based on the type of touch event. Although the touch-sensitive surface 131 and the display panel 141 are implemented as two separate components in FIG. 11 to achieve the input and output functions, however, in some embodiments the touch-sensitive surface 131 may be integrated with the display panel 141 to achieve the input and output functions.

The mobile terminal 1200 may further include the at least one sensor 150, such as a light sensor, a motion sensor, and some other sensor. In greater detail, the light sensor may include an ambient light sensor and a proximity sensor. The ambient light sensor can adjust brightness of the display panel 141 based on the ambient light, and the proximity sensor can turn off the display panel 141 and/or backlight when the mobile terminal 1200 is moved to the ear. As one kind of motion sensor, a gravitational acceleration sensor can detect magnitudes of acceleration in various directions (usually three axes). When the mobile terminal 1200 is at rest, the gravitational acceleration sensor can detect a magnitude and direction of the gravity force. The gravitational acceleration sensor can be applied to identifying a mobile phone gesture (such as horizontal and vertical screen switching, related games, magnetometer attitude calibration), vibration recognition related functions (such as functions of a pedometer, tapping), etc. As for the mobile terminal 1200, other sensors, such as a gyroscope, a barometer, a hygrometer, a thermometer, an infrared sensor, etc., may be disposed in it, and a description in this regard is not provided.

The audio frequency circuit 160, a speaker 161, and a microphone 162 may provide an audio interface between the user and the mobile terminal 1200. The audio frequency circuit 160 can transmit an electrical signal that is converted from received audio data to the speaker 161, and the electrical signal is converted into an audio signal by the speaker 161 to output. In addition, the speaker 162 converts the collected audio signal into an electrical signal. The electrical signal is received by the audio frequency circuit 160 and converted into audio data. Then, after the audio data is output to the processor 180 and processed, the audio data is sent to, for example, another terminal through the RF circuit 110, or the audio data is output to the memory 120 for further processing. The audio frequency circuit 160 may further include a headphone jack to provide communication between a peripheral headset and the mobile terminal 1200.

The mobile terminal 1200 can help the user send and receive emails, browse web pages and access streaming media, etc., through the transmission module 170 (such as a Wi-Fi module), which provides a wireless broadband Internet access for the user. Although in FIG. 13 the transmission module 170 is shown, it can be understood that the transmission module 170 is not a necessary constituent of the mobile terminal 1200 and may be omitted depending on needs without departing from the spirit of the present disclosure.

The processor 180 is a control center of the mobile terminal 1200. The processor 180 utilizes various interfaces and lines to connect different parts of the cell phone, and runs or executes the software programs and/or modules stored in the memory 120 and calls the data stored in the memory 120 to perform various functions of the mobile terminal 1200 and process data so as to perform overall monitoring of the cell phone. Optionally, the processor 180 may include one or more processing cores. In at least one embodiment, the processor 180 may integrate an application processor and a modem processor. The application processor is mainly responsible for processing the operating system, user interfaces and application programs, etc. The modem processor mainly handles wireless communications. The modem processor may not be integrated into the processor 180.

The mobile terminal 1200 further includes the power supply 190 (such as a battery) that supplies power to various components. In at least one embodiment, the power supply 190 may be logically connected to the processor 180 through a power management system to manage functions, such as charging, discharging, and power management, through the power management system. The power supply 190 may further include one or more than one components, such as a DC or AC power supply, a recharging system, a power failure detection circuit, a power converter or an inverter, a power status indicator, and the like.

Although not shown, the mobile terminal 1200 may further include a camera, a Bluetooth module, or the like, and a description in this regard is not provided. In greater detail, the display unit 140 of the mobile terminal 1200 is a touch display according to the present embodiment. The mobile terminal includes one or more processors, a memory and one or more program instructions stored in the memory. The one or more program instructions executed by the one or more processors to perform the following operations.

Data to be encrypted and user information set relevant to the encryption are acquired.

A key acquisition instruction is sent to a terminal corresponding to the user information based on the user information set relevant to the encryption.

A key returned from the terminal corresponding to the user information is received.

The data to be encrypted is encrypted by using the key.

Encrypted data is transmitted to the terminal corresponding to the user information.

Encrypted data and relevant user information that is set are acquired.

A decryption key for the encrypted data is acquired based on the relevant user information.

The encrypted data is decrypted by using the decryption key.

The data is opened if decryption is successful.

The mobile terminal according to the present embodiment may be applied to the previous method embodiments correspondingly. A detailed description may be referred to the description of the previous embodiments, and a description in this regard is not provided.

All or part of the procedure introduced in the aforementioned embodiment may be completed in related hardware commanded by a computer program, which may be easily understood by one of ordinary skill in the art. The program may be stored in a computer-readable storage medium. The computer-readable storage medium may be a read-only memory (ROM), a random access memory (RAM), a disc, an optical disc, and so on.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. An encryption method for encrypting data comprising:
    acquiring the data to be encrypted and user information relevant to the encryption including acquired user information of a sending terminal and acquired user information of a corresponding terminal;
    acquiring user information of the sending terminal, turning on a eyeball acquisition module of the sending terminal based on a successful validation of the acquired user information of the sending terminal, and collecting eyeball information of a user of the sending terminal by the eyeball acquisition module of the sending terminal;
    sending, based on the user information relevant to the encryption, a key acquisition instruction to the corresponding terminal, to instruct the corresponding terminal to collect eyeball information of a user of the corresponding terminal by an eyeball acquisition module of the corresponding terminal, wherein the eyeball information of the user of the corresponding terminal is served as a key;
    receiving the key returned from the corresponding terminal;
    encrypting the data to be encrypted by using the returned key and the eyeball information of the user of the sending terminal;
    transmitting encrypted data to the corresponding terminal to turn on the eyeball acquisition module of the corresponding terminal;
    collecting the eyeball information of the user of the corresponding terminal by the eyeball acquisition module of the corresponding terminal;
    opening a video window of the corresponding terminal to collect the eyeball information of the user of the sending terminal through the video window, wherein the encrypted data can be decrypted by using the eyeball information of the user of the corresponding terminal and the eyeball information of the user of the sending terminal.

2. The encryption method as claimed in claim 1, wherein after the sending, based on the user information set relevant to the encryption, a key acquisition instruction to a corresponding terminal, the encryption method further comprises:
    determining whether the key returned from the corresponding terminal is received within a predetermined time period;
    rejecting a data transmission operation if it is determined that the key returned from the corresponding terminal is not received within the predetermined time period;
    encrypting the data to be encrypted by using the key if it is determined that the key returned from the corresponding terminal is received within the predetermined time period.

3. A decryption method for decrypting encrypted data comprising:
    acquiring the encrypted data and user information corresponding to the decryption, wherein the encrypted data is the data encrypted by an encryption method, and
    the encryption method comprises:
    acquiring the data to be encrypted and user information relevant to the encryption including acquired user information of a sending terminal and acquired user information of a corresponding terminal;
    acquiring user information of the sending terminal, turning on a eyeball acquisition module of the sending terminal based on a successful validation of the acquired user information of the sending terminal, and collecting eyeball information of a user of the sending terminal by the eyeball acquisition module of the sending terminal;
    sending, based on the user information relevant to the encryption, a key acquisition instruction to the corresponding terminal, to instruct the corresponding terminal to collect eyeball information of a user of the corresponding terminal by an eyeball acquisition module of the corresponding terminal, wherein the eyeball information of the user of the corresponding terminal is served as a key;

receiving the key returned from the corresponding terminal;

encrypting the data to be encrypted by using the returned key and the eyeball information of the user of the sending terminal; and transmitting encrypted data to the corresponding terminal to turn on the eyeball acquisition module of the corresponding terminal;

collecting the eyeball information of the user of the corresponding terminal by the eyeball acquisition module of the corresponding terminal;

opening a video window of the corresponding terminal to collect the eyeball information of the user of the sending terminal, wherein the eyeball information of the user of the sending terminal collected by the video window is configured to decrypt the encrypted data;

acquiring a key for decrypting the encrypted data based on the user information corresponding to the decryption comprises:

collecting the eyeball information of the user of a corresponding terminal by the eyeball acquisition module of the corresponding terminal when the user information corresponding to the decryption matches the user information of the corresponding terminal;

opening the video window of the corresponding terminal to collect the eyeball information of the user of the sending terminal through the video window;

decrypting the encrypted data by using the key, wherein the decrypting the encrypted data by using the key comprises:

decrypting the encrypted data by using the eyeball information of the user of the corresponding terminal and the eyeball information of the user of the sending terminal; and opening the data if the decryption is successful.

4. The decryption method as claimed in claim 3, wherein after decrypting the encrypted data by using the key, the decryption method further comprises:

determining whether a number of times that decryption fails exceeds a preset threshold value within a predetermined time period; and deleting the encrypted data if the number of times that decryption fails exceeds the preset threshold value.

5. An encryption device for encrypting data comprising:

an acquisition module configured to acquire the data to be encrypted and user information relevant to the encryption including acquired user information of a sending terminal and acquired user information of a corresponding terminal;

an information acquisition module configured to acquire user information of the sending terminal;

a turning-on module configured to turn on an eyeball acquisition module of the sending terminal based on a successful validation of the acquired user information of the sending terminal;

an eyeball acquisition module configured to collect eyeball information of a user of the sending terminal;

an instruction sending module configured to send, based on the user information relevant to the encryption, a key acquisition instruction to the corresponding terminal, to instruct the corresponding terminal to collect eyeball information of a user of the corresponding terminal by an eyeball acquisition module of the corresponding terminal, wherein the eyeball information of the user of the corresponding terminal is served as a key;

a key receiving module configured to receive the key returned from the corresponding terminal;

an encryption module configured to encrypt the data to be encrypted based on the returned key and the eyeball information of the user of the sending terminal;

a transmission module configured to transmit encrypted data to the corresponding terminal to turn on the eyeball acquisition module of the corresponding terminal;

wherein the eyeball information of the user of the corresponding terminal is collected by the eyeball acquisition module of the corresponding terminal;

a video window of the corresponding terminal is opened to collect the eyeball information of the user of the sending terminal, wherein the eyeball information of the user of the sending terminal is collected by the video window and the encrypted data can be decrypted by using the eyeball information of the user of the corresponding terminal and the eyeball information of the user of the sending terminal.

6. The encryption device as claimed in claim 5, further comprising:

a judge module configured to determine whether the key returned from the corresponding terminal is received within a predetermined time period;

a rejection module configure to reject a data transmission operation if it is determined that the key returned from the corresponding terminal is not received within the predetermined time period;

wherein the encryption module is further configured to encrypt the data to be encrypted by using the key if it is determined that the key returned from the corresponding terminal is received within the predetermined time period.

7. A decryption device for decrypting encrypted data comprising:

an acquisition module configured to acquire the encrypted data and user information corresponding to the decryption, wherein the encrypted data is data encrypted by an encryption device, and the encryption device comprises:

an acquisition module configured to acquire the data to be encrypted and user information relevant to the encryption including acquired user information of a sending terminal and acquired user information of a corresponding terminal;

an information acquisition module configured to acquire user information of the sending terminal;

a turning-on module configured to turn on an eyeball acquisition module of the sending terminal based on a successful validation of the acquired user information of the sending terminal;

an eyeball acquisition module configured to collect eyeball information of a user of the sending terminal;

an instruction sending module configured to send, based on the user information relevant to the encryption, a key acquisition instruction to the corresponding terminal, to instruct the corresponding terminal to collect eyeball information of a user of the corresponding terminal by an eyeball acquisition module of the corresponding terminal, wherein the eyeball information of the user of the corresponding terminal is served as a key;

a key receiving module configured to receive the key returned from the corresponding terminal;

an encryption module configured to encrypt the data to be encrypted based on the returned key and the eyeball information of the user of the sending terminal;

a transmission module configured to transmit encrypted data to the corresponding terminal to turn on the eyeball acquisition module of the corresponding terminal;

wherein the eyeball information of the user of the corresponding terminal is collected by the eyeball acquisition module of the corresponding terminal;

a video window of the corresponding terminal is opened to collect the eyeball information of the user of the sending terminal, wherein the eyeball information of the user of the sending terminal collected by the video window is configured to decrypt the encrypted data;

a decryption acquiring module configured to acquire a key for decrypting the encrypted data based on the user information corresponding to the decryption, and decryption acquiring module comprising:

a turning-on module configured to turn on the eyeball acquisition module of the corresponding terminal when the user information corresponding to the decryption matches the user information of the corresponding terminal; and the eyeball acquisition module configured to acquire the eyeball information of the user of the corresponding terminal;

the video window opening module configured to open the video window of the corresponding terminal;

a video window acquisition module configured to acquire the eyeball information of the user of the sending terminal through the video window;

a decryption module configured to decrypt the encrypted data by using the eyeball information of the user of the corresponding terminal and the eyeball information of the user of the sending terminal; and an opening module configured to open the data if the decryption is successful.

8. The decryption device as claimed in claim 7 further comprising:

a time judge module configured to determine whether a number of times that decryption fails exceeds a preset threshold value within a predetermined time period;

a data deletion module configured to delete the encrypted data if the number of times that decryption fails exceeds the preset threshold value.

* * * * *